June 2, 1959  J. SELZER  2,889,059
POWER ACTUATED TAIL GATE ELEVATOR FOR MOTOR VEHICLES
Filed Oct. 23, 1957  3 Sheets-Sheet 1
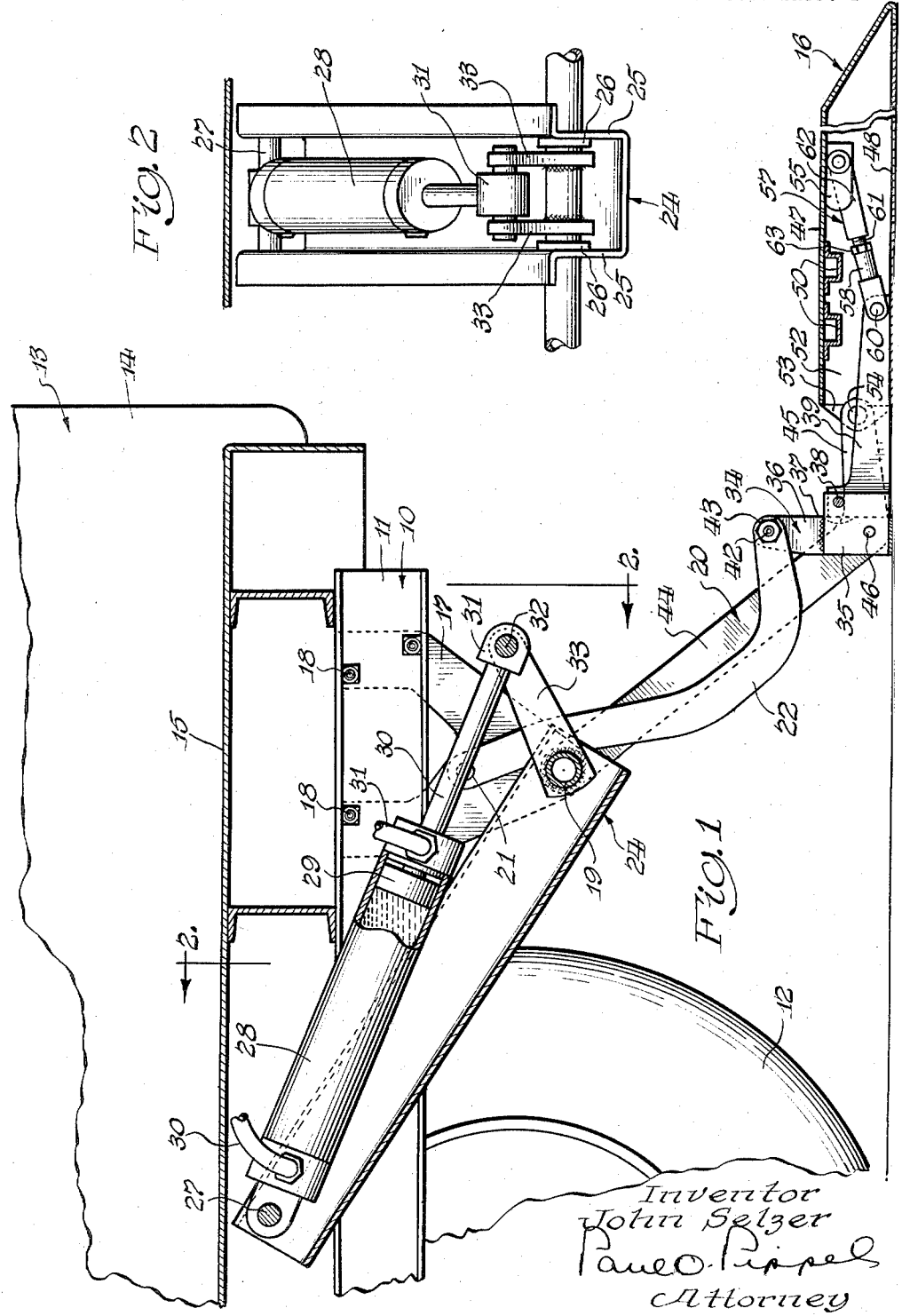
Inventor
John Selzer
Paul O. Pippel
Attorney

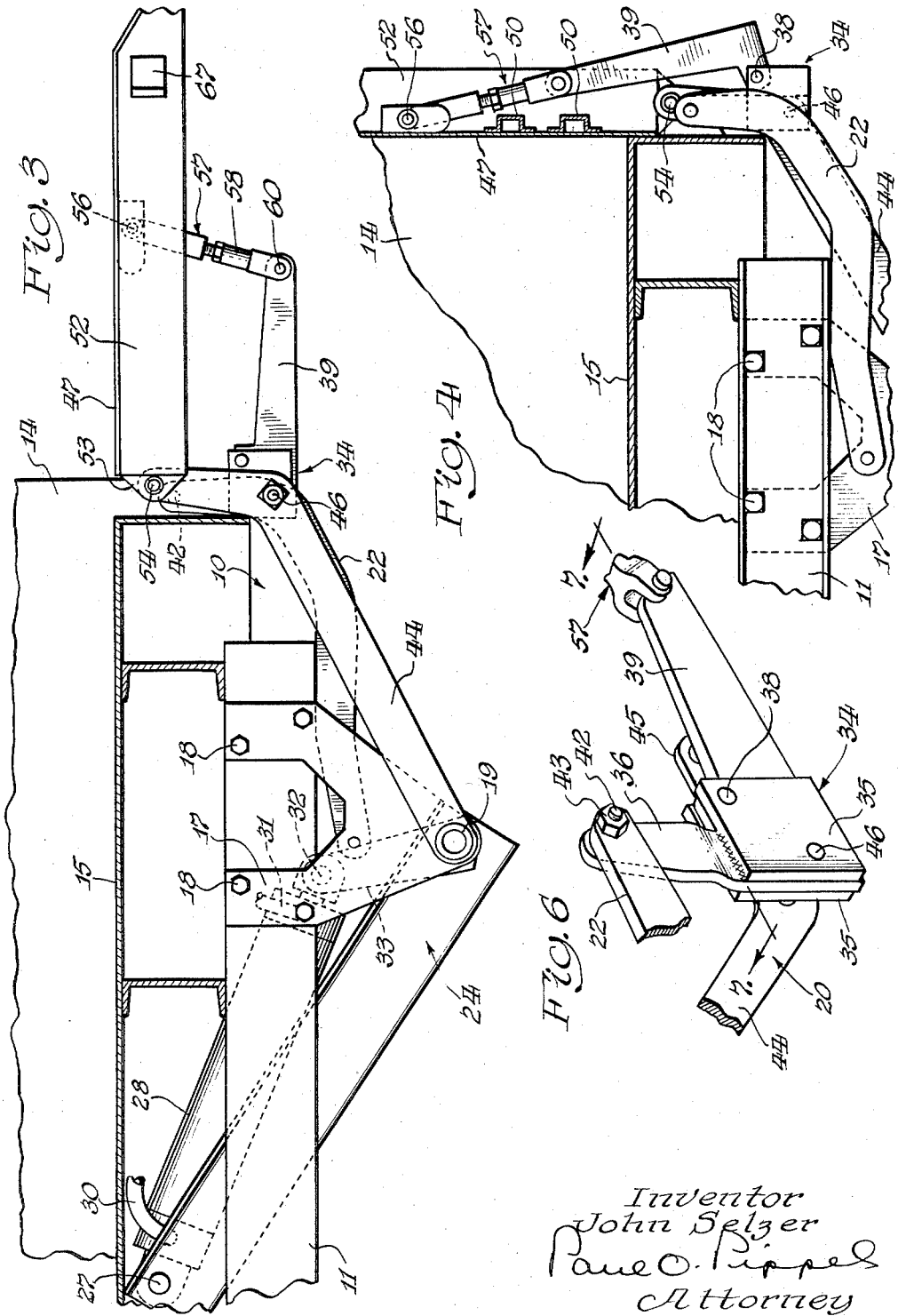

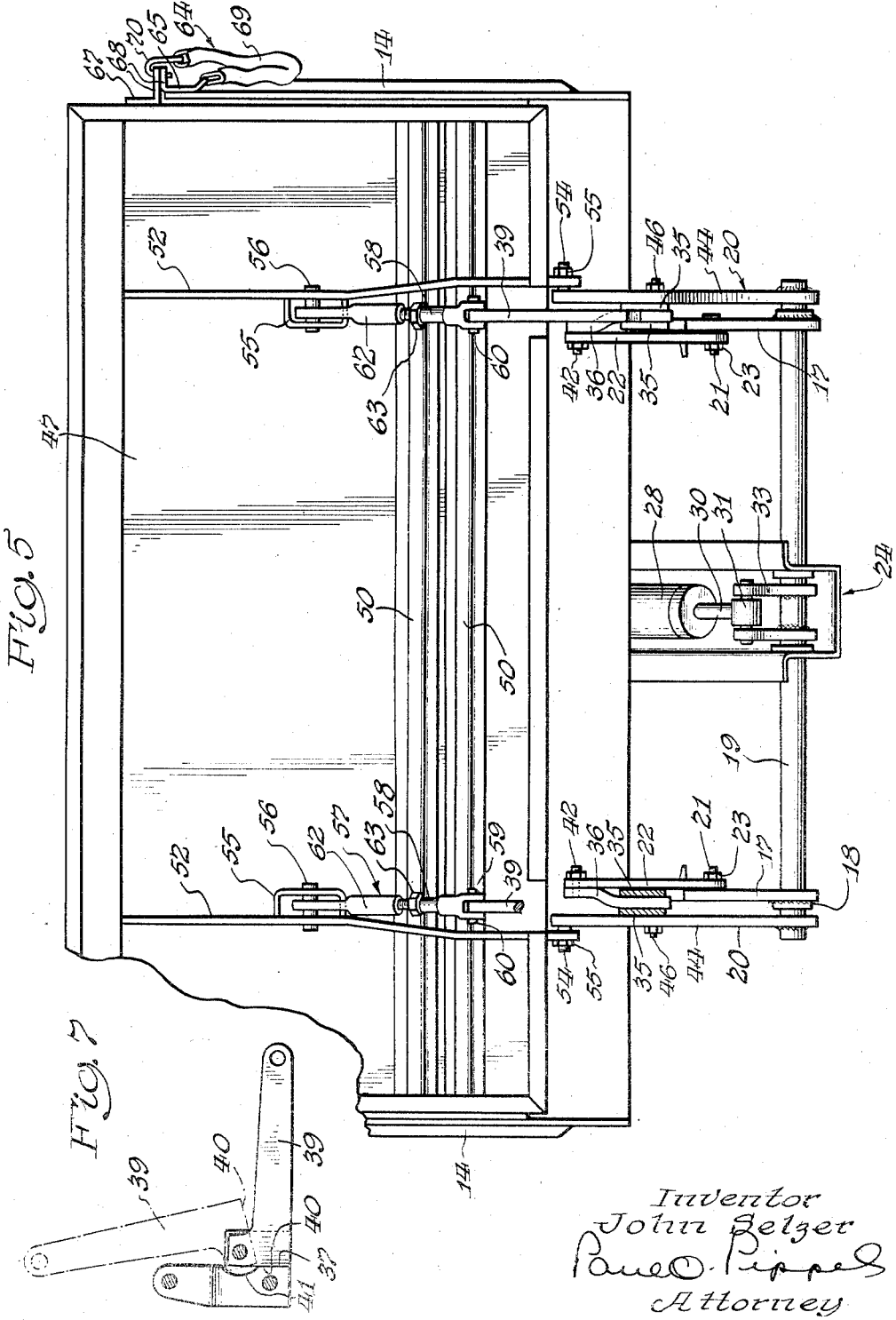

2,889,059

POWER ACTUATED TAIL GATE ELEVATOR FOR MOTOR VEHICLES

John Selzer, Fort Wayne, Ind.

Application October 23, 1957, Serial No. 691,956

8 Claims. (Cl. 214—77)

This invention relates to power actuated tail gate elevators for motor vehicles and more particularly to a new and improved combination load carrying platform and end gate member, and means for moving the member vertically while disposed horizontally to facilitate loading and unloading of the vehicle body with which it is associated.

An important object of the present invention is the provision of a power actuated elevating end gate structure connected to the vehicle body in such a manner that the stresses developed in this structure during the elevating operation are not transmitted to the vehicle body to adversely effect the same.

A still further object is the provision of a relatively light weight but sturdily constructed power actuated end gate elevator for motor trucks which may be readily adapted to truck bodies of various manufacturers without the necessity of extensive modification of the motor trucks.

Still another object is to provide an end gate elevator adapted to close the end opening of a truck body in such a manner as to render the body grain-tight for hauling any type of loose material, such as wheat, oats, sand, and the like.

The foregoing and other important objects and desirable features inherent in and encompassed by the invention together with many of the purposes and uses thereof will become readily apparent from a reading of the ensuing description in conjunction with the annexed drawings in which:

Figure 1 is a side elevational view of the rear portion of a motor truck having the invention mounted thereon; certain parts of the invention are in section to better illustrate the same and the components of the invention are shown in the position to receive cargo thereon at ground level;

Figure 2 is an end view partly in section looking along line 2—2 of Figure 1 of the power cylinder and the supporting frame therefor;

Figure 3 is a view similar to Figure 1, except that the elevating or lifting tail gate is shown in the raised position;

Figure 4 is a fragmentary detail view showing the load carrying platform or tail gate in its raised and body closing position;

Figure 5 is an end view of the elevating tail gate structure showing the end gate in its raised and body enclosing position;

Figure 6 is a fragmentary perspective view of a hinge support link and the parts connected thereto; and Figure 7 is a detail view of the hinge support link and hinge arm illustrating the hinge arm in the position assumed thereby when the load carrying platform is horizontally disposed; the broken lines represent the position of the hinge arm when the load carrying platform is vertically disposed and raised.

Referring to the drawings in detail, wherein like reference characters represent like elements throughout the various views, the invention is shown in conjunction with a conventional motor truck chassis frame 10 which includes a pair of transversely spaced longitudinally extending side sill members 11. The chassis frame 10 is supported upon and driven by rear wheels 12 (one of which is partially shown in Figure 1) and a body 13 is in turn supported by the chassis frame 10 by means of transversely extending longitudinally spaced cross bolsters interposed between and attached to the body 13 and the chassis frame 10. The truck body 13 has vertical side walls 14 interconnected by a floor or bed 15. The rear end of the body 13 is open and is adapted to be closed by a combination load carrying platform and end gate 16.

Attached to each side sill member 11 adjacent the rearwardmost end thereof is a mounting plate 17. The plates 17 are rigidly fixed to the side sill members 11 by means of nuts and bolts 18 and are arranged to be in transverse alignment. Portions of the brackets 17 depend below the side sill members 11 and are provided with bearings for rotatably supporting a tubular rock shaft 19. Rigidly secured as by welding to the end portion of the shaft 19 projecting outwardly transversely from each plate 17 is one end of an elongated lifting arm 20. Each plate 17 also carries a transversely extending pivot pin 21, the axis of which is vertically spaced above and parallel to the rocking axis of the shaft 19. The axis of each pivot pin 21 are in transverse alignment and lie in a vertical plane containing the pivotal axis of the shaft 19. One end of a stabilizing arm 22 is mounted on each pivot pin 21 and is retained thereon by means of a nut 23.

Extending longitudinally and disposed substantially along the median line of the chassis frame 10 is a channel shaped support frame 24. The vertical legs 25 of the support frame 24 are provided with bearings 26 through which the rock shaft 19 extends. Suitable means such as hanger brackets (not shown) are preferably employed for supporting the frame 24 from the chassis frame 10. The forwardmost end of the frame 24 is provided with a transversely extending pivot pin 27 to which one end of a hydraulic cylinder 28 is connected. It is to be understood that while hydraulic means for raising and lowering the combination load carrying platform and end gate 16 are to be described hereinafter in detail, other power producing means such as an electric motor may be utilized without departing from the spirit and scope of the invention.

A piston head 29 is slidably mounted within the cylinder 28 and has a piston rod 30 secured thereto. The piston rod 30 projects rearwardly from the rear end wall of the cylinder 28. Pressure fluid is furnished to the hydraulic system by a pump (not shown) which is driven by the vehicle engine or some other means on the vehicle. Conduits 30 and 31 lead to and from the pump and operatively interconnect the pump with the cylinder 28. Valve means (not shown) are provided for controlling the admission of fluid under pressure to the cylinder 28 and the exhausting of fluid therefrom whereby the piston head 29 can be moved longitudinally with respect to the cylinder 28. Longitudinal movement of the piston 29 effects longitudinal movement of the piston rod 30. The outer end of the piston rod 30 is in the form of an enlarged bearing block 31 in which a transversely extending pivot pin 32 is journalled. The ends of the pin 32 project from respective opposite sides of the bearing block 31 and are each secured to one end of a respective crank arm 33. As best shown in Figure 5, the crank arms 33 are transversely spaced and are rigidly secured as by welding to the rockshaft 19. From the foregoing it will be appreciated that forcing of the piston 29 forwardly, as viewed in Figure 1, by the admission of fluid under pressure through conduit 31 to the cylinder 28 effects rocking of the shaft 19 and swinging of the lifting arms 20 which are secured thereto. Inasmuch as both ends of the piston and cylinder assembly are connected to the support frame 24, all of the stresses and strains developed during the raising and lowering operation of the combination load-carrying platform and end gate 16 are contained within the frame 26 and are not transmitted to the vehicle chassis frame 10 or the vehicle body 13 to damage the same. Consequently the hanger support means for connecting the frame 24 to the chassis frame 10 need be only strong enough to support the weight of the frame 24 and the components described hereinbefore mounted thereon.

The ends of the lifting arms 20 and the stabilizing arms 22 opposite their connections with the rockshaft 19 are interconnected by means of a pair of hinging brackets designated generally by numeral 34. As best shown in Figure 6, the hinging bracket 34 includes a pair of substantially square plates 35 having an elongated bar 36 sandwiched therebetween which is rigidly fixed to the plates by means of welding or the like. Inasmuch as the hinging bracket 34 and the various connections thereto on each side of the vehicle are the same, the detailed construction and description of one hinge bracket 34 will suffice. Portions of the plates 35 extend beyond the rearwardmost edge 37 of the elongated bar 36 and such spaced and parallel portions carry a pivot pin 38 adjacent the uppermost edges thereof. The pivot pin 38 provides a means for connecting one end of a hinging arm 39 to the hinging bracket 34. The forwardmost edge 40 of the hinging arm 39 is flat and is adapted to abut a portion of the rearwardmost edge 37 of the bar 36 between the plates 35. The flat edge portion of the rearwardmost edge 37 of the bar 36 is disposed between the plates 35 serves as a stop abutment for limiting pivotal movement of the hinging arm 39 in a clockwise direction, as viewed in Figure 7. When the edges 40 and 37 are in engagement the arm 39 extends rearwardly substantially horizontally from the bracket 34. In order to accommodate pivotal movement of the arm 39 from the position shown in Figure 7 to the dotted line position shown in Figure 7 the rearwardmost edge 37 of the bar 36 is notched as indicated by numeral 41. The end of the stabilizing arm 22 opposite the pivot pin 21 is pivotally connected to the uppermost end of the bar 36 by means of a pivot pin 42 and lock nut 43. As shown in Figure 1, the lifting arm 20 is formed with a relatively long straight section 44 and a relatively short section 45 angularly disposed with respect to the long section. A transversely extending pivot pin 46 carried by the hinging bracket 34 is utilized to pivotally connect the lifting arm 20 at the juncture of the long section 44 and the short section 45 to the hinging bracket 34. The pivot pin 46 is vertically spaced below the pivot pin 42 and both pivot pins lie in a vertical plane which is substantially parallel to the plane containing the pivotal axis of the rockshaft 19 and the pivot pin 21. It is also to be noted that the vertical spacing between the pivot pins 46 and 42 is substantially the same as the vertical spacing between the rocking axis of the shaft 19 and the pivot pin 21 and as a result the stabilizing arm 22, lifting arm 44, hinging bracket 34 and the mounting bracket 17 form a parallelogram. Thus, since a parallelogram linkage is provided, swinging of the lifting arm 20 by rocking of the shaft 19 effects simultaneous movement of the stabilizing arm 22 and the hinging bracket 34. It will be appreciated that the vertically aligned relation of the pivot pin 42 and pivot pin 46 remains the same during such movement of the arms 20 and 22.

The combination load-carrying platform and end gate 16 is in the form of a rectangular box-like structure having a top wall 47 and a bottom wall 48 made of heavy sheet metal or the like. A pair of transversely extending channel members 50 are welded to the underside of the top plate 47 to strengthen the same and add rigidity to the end gate 16. Extending longitudinally and lying in a generally vertical plane, as viewed in Figure 1, is a hinge and support bar 52 which is rigidly connected to the top and bottom walls respectively as by welding or the like. One end of the bar 52 is in the form of a tab 53 which projects beyond the adjacent edges of the top and bottom walls 47, 48, respectively. The tab 53 is provided with an aperture through which a pivot pin 54 carried by the free end of the relatively short section 45 of the lifting arm 20 extends. A lock nut 55 is threaded on the pivot pin 54 to maintain the pivotal connection between the tab 53 and the lifting arm 20.

Rigidly fastened to the innerside of each bar 52 adjacent the top wall 47 is a U-shaped bearing support 55. A pivot pin 56 extends through the bight portion of the bearing support 55 and the bar 52. A support link, designated generally by numeral 57, has one end pivotally connected to the pivot pin 56 and its opposite end pivotally connected to the support arm 39. The support link 57 includes a clevis 58 having a bifurcated end portion 59 embracing the rearwardmost end of the arm 39 as viewed in Figure 1. A pivot pin 60 is employed to connect the arm and clevis together. The clevis is provided with a threaded aperture for receiving the threaded end 61 of a link element 62. The end of the link element 62 opposite the threaded end 61 is pivotally mounted on the pivot pin 56. From the foregoing it will be appreciated that the length of the support link 57 may be adjusted by removing one of the pivot pins 60 or 56 and thereafter rotating the clevis 58 with respect to the link element 57. A lock nut 62 is provided for maintaining the adjusted length of the support link. The purpose of the adjustability feature of the support link 57 will be pointed out hereinafter.

In use the combination load-carrying platform and end gate 16 and the structure described hereinbefore associated therewith is substituted for the conventional end gate of the vehicle. When the combination load-carrying platform and end gate 16 is functioning as a conventional end gate to close the rear opening in the truck body 13, latch means designated generally by numeral 64 and similar to the latch means used with conventional end gates are provided for locking the member 16 in its body-closing position. The latch means 64 includes a bracket 65 secured to each side 14 of the vehicle body. The bracket 65 includes a laterally projecting extension 66 provided with an aperture. Each lateral side of the member 16 is provided with an L-shaped bracket 67 having a laterally extending leg 68 provided with an aperture alignable with a respective aperture formed in the extension 66 when the member 16 is in its vertical or body-closing position, as illustrated in Figures 4 and 5. A chain 69 having one end secured to the bracket 65 has its other end provided with a latch 70 which is adapted to extend through the aligned apertures of the brackets 67 and 65 to releasably secure the member 16 to the vehicle body 13. When it is desired to load the vehicle body 13 with other objects which are disposed at a level vertically below the level of the truck bed 15 without the need of manually lifting the objects to the level of the truck bed, the member 16 is brought to the level of the object or objects. Assuming that it is desired to raise an object from ground level, the member 16 is placed in the position shown in Figure 1 and while in this position the material or object to be loaded is placed on the combination load-carrying member and end gate 16. Fluid pressure is then directed through conduit 31 to the cylinder 28 to force the piston 29 forwardly drawing the piston rod 30 into the cylinder 28. The piston rod 30, being connected to the crank arm 33, effects rocking movement of the lifting arms 44 in a counter-clockwise direction as viewed in Figure 1. Inasmuch as the stabilizing arms 22 and hinging brackets 34 are a part of the same parallelogram systems as the lifting arms 44, the stabilizing arms 22 and the hinging brackets 34 move simultaneously in the same direction with the lifting arms 44. Simultaneous rocking movement in a counter-clockwise direction of the arms 20 and 22 continues until the short sections 45 of the lifting arms 20 are substantially vertically disposed and the top wall 47 of the end gate 16 lies in a horizontal plane containing the floor 15 of the truck body 14, as shown in Figure 3. The load or object elevated by the end gate 16 is then pushed from the end gate into the body 13 of the vehicle and the end gate 16 may then be lowered again by conditioning the valve means in such a manner that the fluid within the cylinder 28 is allowed to drain through conduit 31. It will be appreciated that the end gate 16 remains in a horizontal plane during the elevating movement and the surface 40 of the arm 52 remains in abutting engagement with the surface 37 of the hinging bracket 34. When the loading or unloading operation is completed, the end gate 16 is pivoted about pivot pins 54 to the vertical position shown in Figures 4 and 5 to close the opening at the rear end of the truck body 13 and latched in this position by the latch means 64. As stated hereinbefore, the length of the support link 57 may be varied because of the manual adjustment feature incorporated therein. The significance of such adjustment is believed obvious after viewing and comparing Figures 1 and 3. In both of these views the angular relationship between a line drawn between pivot pin 60 and pivot pin 46 and a line drawn between pivot pin 54 and pivot pin 56 remains the same during movement of the end gate 16 between its lowered position and its raised position. Similarly, the angular relationship between a line drawn between pivot pins 54 and 46 and between pivot pins 60 and 56 remains the same during the elevating movement of the end gate 16. In essence, such lines form a parallelogram linkage system wherein one of the links (the line drawn through pivot pins 60 and 46) remains substantially horizontal during the elevating movement of the end gate 16. It will be appreciated that by varying the length of one of the links of the parallelogram system, namely, the line drawn through through pivot pins 60 and 56, the angular relationship between the horizontal line drawn through pivot pins 46 and 60 and the line drawn through pivot pins 54 and 56 may be varied. Inasmuch as the top surface of the top wall 47 of the end gate 16 lies in a plane which is fixed with respect to a plane containing the line drawn through pivot pins 54 and 56, varying the angular relationship of the line drawn through pivot pins 54 and 56 with respect to the line drawn through pivot pins 46 and 60 will vary the angular relationship of the top wall 47 with respect to a horizontal plane. Thus after long periods of use and certain of the pivotal connections and components of the end gate elevator structure wear, the top surface of the top wall 47 is no longer disposed in a horizontal plane. Inasmuch as the link 47 may be adjusted, as pointed out hereinbefore, as to its length it is merely necessary to adjust the length of the support link 57 to compensate for the wear of the components and once again place the top wall 47 in a horizontal plane. Furthermore, when loading certain types of cargo, such as oil barrels and the like, it is often desirable to tilt the top wall 47 slightly such that when the barrels or oil drums are elevated to the level of the floor 15 of the body they may be readily rolled into the interior of the body from the end gate 16, since the same is inclined toward the floor of the body to facilitate rolling or discharging of the barrels or drums from the end gate into the body.

The embodiment of the invention chosen for the purposes of illustration and description herein is that preferred for achieving the objects of the invention and developing the utility thereof in the most desirable manner, due regard being had to existing factors of economy, simplicity of design and construction, and the improvements sought to be effected. It will be appreciated, therefore, that the particular structural and functional aspects emphasized herein are not intended to exclude but rather to suggest such other modifications and adaptations of the invention as fall within the spirit and scope of the invention as defined in the appended claims.

What is claimed is:

1. An elevating end gate structure for an automotive vehicle having an open end body and having a horizontal floor vertically spaced above the ground comprising, a combination load-carrying and end gate member adapted to be raised and lowered to and from the level of said floor while disposed in a substantially horizontal rearwardly extending position and moved into a vertical position to close the open end of the body, a pair of arms swingable in unison, each of said arms having one end pivotally connected to the vehicle at vertically spaced and aligned points, the other end of one of said arms being pivotally connected to said member, a vertically disposed support bracket to which said arms are pivotally connected at vertically spaced and aligned points, the distance between said pivotal connection points being substantially the same as the distance between the pivotal connection points of said arms to said vehicle whereby said bracket is maintained vertically disposed during swinging movement of said arms, brace means for supporting said member in its rearwardly extending position, said brace means being pivotally connected to and extending between said bracket and said member, said connection point of said brace means to said member being horizontally spaced from the point of pivotal connection of said one arm to said member when said member is in its rearwardly extending position, said brace means being extensible whereby said member is swingable to its vertical position with respect to said arms about the pivotal connection of said one arm to said member, and manually adjustable means for varying the effective length of said brace means to vary the angular disposition of the member when in its rearwardly extending position with respect to the vehicle body horizontal floor.

2. An elevating end gate structure for an automotive vehicle having an opening at the rear end thereof and having a horizontal floor vertically spaced above the ground comprising, a combination load-carrying and end gate member adapted to be raised and lowered to and from the level of said floor while disposed in a substantially horizontal rearwardly extending position and moved into a vertical position to close the rear open end of the body, movable arm means operatively connected to said vehicle and said member including a pair of arms, one of said arms having one end pivotally connected to said member, a support bracket movable in unison with said arm means, said bracket being maintained substantially vertically disposed during movement of said arm means and being pivotally connected to a portion of said one arm pivotally connected to said member intermediate the ends of the arm, brace means for supporting said member in its rearwardly extending position, said brace means being pivotally connected to and extending between said bracket and said member, the pivotal connection of said brace means to said member being at a point horizontally spaced from the point of connection of said one arm to said member when said member is in its rearwardly extending position, said brace means being extensible whereby said member may be swung to its vertical position with respect to said arm means about the pivotal connection of said arm means to said member, and manually adjustable means for varying the effective length of said brace means to vary the angular disposition of the member when in its rearwardly extending position with respect to the vehicle body horizontal floor.

3. An elevating end gate structure for an automotive vehicle having a body provided with a rear opening and having a horizontal floor vertically spaced above the ground comprising, a combination load-carrying and end gate member adapted to be raised and lowered to and from the level of said floor while disposed in a substantially horizontal rearwardly extending position and moved into a vertical position to close the open end of the body, movable arm means operatively interconnecting said vehicle and said member for raising and lowering said member including a pair of arms, one of said arms having one end pivotally connected to said member, a support bracket movable in unison with said arm means, said support bracket being maintained vertically disposed during movement of said movable arm means and being pivotally connected to a portion of said one arm pivotally connected to said member intermediate the ends of the arm, brace means for supporting said member in its rearwardly extending position, said brace means including an articulated link having one end pivotally connected to said bracket and its opposite end pivotally connected to said member at a point horizontally spaced from the connection of said one arm with said member when said member is in its rearwardly extending position, cooperable means on said bracket and said articulated link to limit the pivotal movement therebetween in one direction; and manually adjustable means for varying the effective length of said articulated link to vary the angular disposition of the member when in its rearwardly extending position with respect to the vehicle body horizontal floor.

4. An elevating end gate structure for an automotive vehicle having a body provided with a rear opening and having a horizontal floor vertically spaced above the ground comprising, a combination load-carrying and end gate member adapted to be raised and lowered to and from the level of said floor while disposed in a substantially horizontal rearwardly extending position and moved into a vertical position to close the open end of the body, movable arm means operatively interconnecting said vehicle and said member for raising and lowering said member including a pair of arms, one of said arms having one end pivotally connected to said member, a support arm movable in unison with said arm means, said support arm being maintained horizontally disposed during movement of said movable arm means and being operatively connected to a portion of said one arm pivotally connected to said member intermediate the ends of the arm, a link having one end pivotally connected to one end of said support arm and its opposite end pivotally connected to said member at a point horizontally spaced from the pivotal connection of said one arm with said member when said member is in its rearwardly extending position, and manually adjustable means for varying the effective length of said link to vary the angular disposition of the member when in its rearwardly extending position with respect to the vehicle body horizontal floor.

5. An elevating end gate structure for an automotive vehicle substantially as set forth in claim 4, in which, said link includes an elongated first part and an elongated second part, and said manually adjustable means for varying the length of said link includes an end portion of said first part provided with internal threads and said second part including a threaded end section cooperable with said internal threads whereby the length of said link may be varied by rotating said second part with respect to said first part.

6. An elevating end gate structure for an automotive vehicle having an opening at the rear end thereof and having a horizontal floor vertically spaced above the ground comprising, a combination load-carrying and end gate member adapted to be raised and lowered to and from the level of said floor while disposed in a substantially horizontal, rearwardly extending position and moved into a vertical position to close the rear open end of the body, a shaft rotatably journalled on said vehicle, arm means operatively connected to said shaft and said member, a longitudinally extending subframe suspended from the underside of said horizontal floor, said shaft extending transversely through one end of said subframe, a piston and cylinder assembly having one end pivotally connected to one end of said subframe and its opposite end operatively connected to said shaft for rocking said shaft and raising and lowering said arm means, a support bracket movable in unison with said arm means, said bracket being maintained substantially vertically disposed during movement of said arm means, brace means for supporting said member in its rearwardly extending position, said brace means being pivotally connected to and extending between said bracket and said member, said connection point of said brace means to said member being horizontally spaced from the point of connection of said arm means to said member when said member is in its rearwardly extending position, said brace means being extensible whereby said member is swingable to its vertical position with respect to said arm means, and manually adjustable means for varying the effective length of said brace means to vary the angular disposition of the member when in its rearwardly extending position with respect to the vehicle body horizontal floor.

7. An elevating end gate structure for an automotive vehicle substantially as set forth in claim 6, in which, said brace means includes a support arm having one end pivotally connected to said support bracket and a link having one end pivotally connected to one end of said arm and its opposite end pivotally connected to said member; and cooperable means on said bracket and said support arm to limit the pivotal movement therebetween in one direction.

8. An elevating end gate structure for an automotive vehicle substantially as set forth in claim 7, in which, said link includes an elongated first part and an elongated second part, and said manually adjustable means for varying the effective length of said brace means includes an end portion of said first part provided with internal threads and said second part including a threaded end section cooperable with said internal threads whereby the length of said link may be varied by rotating said second part with respect to said first part.

References Cited in the file of this patent
UNITED STATES PATENTS

| | | |
|---|---|---|
| 2,683,539 | Corley | July 13, 1954 |
| 2,684,770 | Park | July 27, 1954 |
| 2,725,152 | Gwinn | Nov. 29, 1955 |
| 2,768,758 | French | Oct. 30, 1956 |